United States Patent
Kelley et al.

(10) Patent No.: US 8,146,163 B2
(45) Date of Patent: Mar. 27, 2012

(54) METHOD AND SYSTEM FOR SECURING PERSONAL COMPUTING DEVICES FROM UNAUTHORIZED DATA COPYING AND REMOVAL

(75) Inventors: Edward E. Kelley, Wappingers Falls, NY (US); Tijs Y. Wilbrink, Leiden (NL)

(73) Assignee: International Business Machines Corporation, Armonk, NY (US)

( * ) Notice: Subject to any disclaimer, the term of this patent is extended or adjusted under 35 U.S.C. 154(b) by 1284 days.

(21) Appl. No.: 11/558,162

(22) Filed: Nov. 9, 2006

(65) Prior Publication Data
US 2008/0115230 A1 May 15, 2008

(51) Int. Cl.
*G06F 21/00* (2006.01)
(52) U.S. Cl. .................. 726/26; 726/27; 726/29; 726/31
(58) Field of Classification Search .................. 713/100, 713/189, 193, 194; 726/2, 16, 17, 20, 21, 726/26, 27, 29, 31, 32; 710/15, 16, 8, 10, 710/12, 17, 18; 719/321, 327
See application file for complete search history.

(56) References Cited

U.S. PATENT DOCUMENTS

| | | | |
|---|---|---|---|
| 6,167,538 A * | 12/2000 | Neufeld et al. ............. | 714/47.2 |
| 6,463,540 B1 * | 10/2002 | Lelong et al. ............... | 726/17 |
| 6,957,217 B2 | 10/2005 | Raverdy et al. | |
| 7,082,598 B1 * | 7/2006 | Le et al. ..................... | 717/127 |
| 7,584,501 B2 * | 9/2009 | Stancil ....................... | 726/4 |
| 7,788,425 B2 * | 8/2010 | Ikemoto ..................... | 710/36 |
| 2002/0007425 A1 * | 1/2002 | Kaysen ...................... | 710/14 |
| 2002/0120854 A1 * | 8/2002 | LeVine et al. .............. | 713/189 |
| 2002/0143921 A1 * | 10/2002 | Stephan ..................... | 709/223 |
| 2003/0115324 A1 | 6/2003 | Blumenau et al. | |
| 2004/0139343 A1 * | 7/2004 | Shieh ......................... | 713/200 |
| 2004/0236945 A1 * | 11/2004 | Risan et al. ................. | 713/165 |
| 2005/0010784 A1 * | 1/2005 | Ito et al. ..................... | 713/182 |
| 2005/0066060 A1 * | 3/2005 | Pinkerton et al. .......... | 709/249 |
| 2005/0066165 A1 | 3/2005 | Peled et al. | |
| 2005/0071439 A1 * | 3/2005 | Bookman et al. .......... | 709/217 |
| 2005/0071631 A1 | 3/2005 | Langer | |
| 2005/0138433 A1 * | 6/2005 | Linetsky .................... | 713/202 |
| 2005/0242924 A1 * | 11/2005 | Yosim et al. ............... | 340/5.74 |
| 2005/0246723 A1 * | 11/2005 | Bhesania et al. ........... | 719/321 |
| 2005/0273845 A1 * | 12/2005 | Urano et al. ................ | 726/9 |

* cited by examiner

*Primary Examiner* — Eleni Shiferaw
*Assistant Examiner* — Hilary Branske
(74) *Attorney, Agent, or Firm* — Cantor Colburn LLP

(57) ABSTRACT

A method for securing personal computing devices from unauthorized data copying and removal includes detecting an attachment of a device to a client included within a computing network; determining whether the detected attached device is permitted to be attached to the client; prompting a user of the client to remove the attached device therefrom in the event the detected attached device is not permitted to be attached to the client; and loading a replacement device driver onto the client in the event the attached device has not been removed, wherein the replacement device driver prevents the client from copying data to the attached device.

16 Claims, 3 Drawing Sheets

METHOD AND SYSTEM FOR SECURING PERSONAL COMPUTING DEVICES FROM UNAUTHORIZED DATA COPYING AND REMOVAL

BACKGROUND

The present invention relates generally to securing the digital content of computer networks, and, more particularly, to a method and system for securing personal computing devices from unauthorized data copying and removal.

The information and knowledge created and accumulated by organizations and businesses are arguably among their most valuable assets. As such, managing and keeping the information and the knowledge inside the organization is of paramount importance for almost any organization, government entity or business, and provides for significant leveraging of its value. Most of the information in modern organizations and businesses is represented in a digital format. It is well known that digital content may be easily copied and distributed (e.g., via e-mail, instant messaging, peer-to-peer networks, file transfer protocol (FTP), portable media and websites), which greatly increases hazards such as business espionage and data leakage.

Some of the actions performed by a user on an accessible personal computer (e.g., saving a confidential document under another name, copying some of the information to another document, printing the document and copying or moving a file that contains confidential information to portable media, etc.) may not comply with the organizational policy regarding confidential information, and may cause a harmful leakage of confidential information. This poses a particular problem, given the recent proliferation of high-density USB (Universal Serial Bus) flash drives. USB flash drives (also referred to as "memory keys") are NAND-type flash memory data storage devices integrated with a USB interface, and are typically small, lightweight, removable and rewritable. The present memory capacity of commercially available USB flash drives typically ranges from about 8 megabytes to about 64 gigabytes.

USB flash drives have several advantages over other portable storage devices, such as floppy disk and compact discs. They are generally faster, hold more data, and are considered more reliable, due to the lack of moving parts therein. These types of drives use the USB mass storage standard, and are supported natively by modern operating systems such as Linux, Mac OS X, and Windows XP.

More specifically, a flash drive consists of a small printed circuit board encased in a robust plastic or metal casing, making the drive sturdy enough to be carried about in a pocket, as a keyfob, or on a lanyard. Only the USB connector protrudes from this protective casing, and is usually covered by a removable cap. Most flash drives use a standard type-A USB connection, allowing them to be connected directly to a port on a personal computer. In addition, most flash drives are active only when powered by a USB computer connection, and require no other external power source or battery power source. To access the data stored in a flash drive, the flash drive must be connected to a computer, either by direct connection to the computer's USB port or via a USB hub.

Flash drives present a significant security challenge for large organizations. Their small size and ease of use allows unsupervised visitors or unscrupulous employees to smuggle confidential data out with little chance of detection. In order to prevent this, some organizations may perhaps forbid the use of flash drives altogether, while some computers are physically configured to disable the mounting of USB mass storage devices by ordinary users. In an even "lower-tech" security solution, some organizations may actually disconnect USB ports inside the computer or fill the USB sockets with epoxy. However, it would be desirable to be able to provide a more robust solution to unauthorized data copying in the event that certain authorized computers and/or individuals within and organization require the use of such devices.

SUMMARY

The foregoing discussed drawbacks and deficiencies of the prior art are overcome or alleviated by a method for securing personal computing devices from unauthorized data copying and removal. In an exemplary embodiment, the method includes detecting an attachment of a device to a client included within a computing network; determining whether the detected attached device is permitted to be attached to the client; prompting a user of the client to remove the attached device therefrom in the event the detected attached device is not permitted to be attached to the client; and loading a replacement device driver onto the client in the event the attached device has not been removed, wherein the replacement device driver prevents the client from copying data to the attached device.

In another embodiment, a method for securing personal computing devices from unauthorized data copying and removal includes detecting an attachment of a device to a client included within a computing network; determining whether the detected attached device is permitted to be attached to the client by examination of a client profile stored on a server included within the computing network; prompting a user of the client to remove the attached device therefrom in the event the detected attached device is not permitted to be attached to the client; loading a replacement device driver onto the client in the event the attached device has not been removed, wherein the replacement device driver prevents the client from copying data to the attached device; receiving, in the event the attached device is permitted to be attached to the client, a request from the client to copy a file stored within the computing network; determining whether the requested file is permitted to be copied by the requesting client; and preventing copying of the requested file by the requesting client in the event that the requested file is not permitted to be copied by the requesting client.

In still another embodiment, a system for securing personal computing devices from unauthorized data copying and removal includes a computing network having a client in communication with one or more servers. The computing network is further configured to detect an attachment of a device to the client; determine whether the detected attached device is permitted to be attached to the client; prompt a user of the client to remove the attached device therefrom in the event the detected attached device is not permitted to be attached to the client; and load a replacement device driver onto the client in the event the attached device has not been removed, wherein the replacement device driver prevents the client from copying data to the attached device.

BRIEF DESCRIPTION OF THE DRAWINGS

Referring to the exemplary drawings wherein like elements are numbered alike in the several Figures.

DETAILED DESCRIPTION

Disclosed herein is a method and system for securing personal computing devices from unauthorized data copying and removal. Briefly stated, a computing system is configured with the capability of recognizing all devices attached to one or more personal computers connected to the system (e.g., memory keys, hard drives, CD and DVD writers, etc.) A profile for each PC is stored on one or more system servers, which identify what devices are allowed to be attached thereto. When a PC accesses a server, the server profile is checked and compared to the attached devices. If a detected connected device is not allowed, the server prompts the PC user to remove the device, and if the device is not thereafter removed, a mechanism is provided whereby the PC is prevented from copying data to the unauthorized device.

Moreover, even if the attached device is permitted by the system, a second level of security determines whether the PC is authorized to copy specifically requested files from the server. Any attempts to copy unauthorized files are prevented by the server. Optionally, in the event repeated attempts to copy unauthorized files are made, the PC may be subjected to a form of permanent disablement with respect to copying capability, such as by blowing of electrically programmable fuses within the device so as to render certain data paths inoperable and not restorable.

Figure 1:
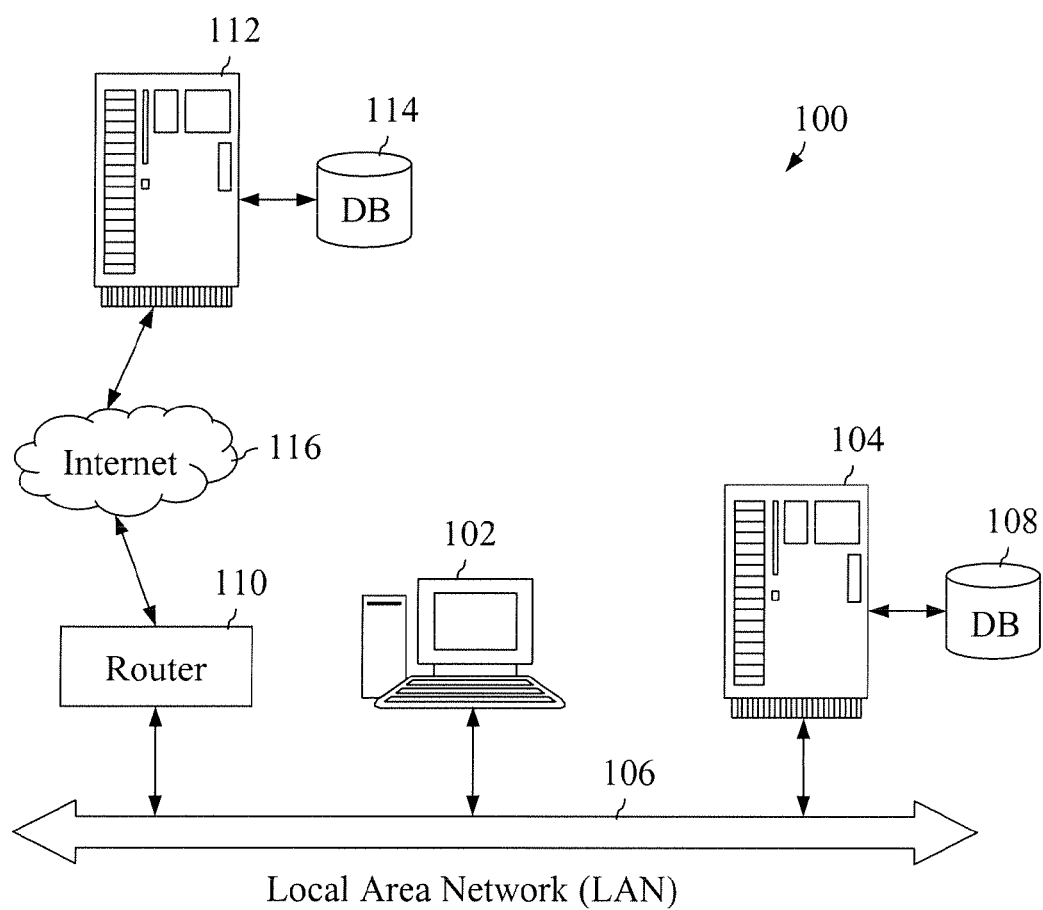
FIG. 1 is a schematic block diagram of an exemplary computer networking system, suitable for use in accordance with an embodiment of the invention.

Referring initially to FIG. 1, there is shown a schematic block diagram of an exemplary computer networking system 100, suitable for use in accordance with an embodiment of the invention. As is shown, one or more client devices 102 communicate with a server 104 over a network 106. In an exemplary embodiment, the network 106 is a Local Area Network (LAN) using TCP/IP protocol over Ethernet. However, the network 106 may represent any other class of network known in the art (e.g., the Internet, an Intranet, a Wide Area Network (WAN), Storage Area Network (SAN), etc.), using any physical network interface (e.g., Ethernet, 802.11 Wireless networking, HPNA, HomePlug, IEEE-1394, etc.) and any network communication protocol (e.g., TCP/IP, UDP/IP, RTP, HTTP, RTSP, SSL, etc.). The server 104 connected to the LAN 106 communicates with a storage database 108, which may represent any type of non-volatile storage known in the art (e.g., hard disk drive, an array of hard disk drives, optical disk, non-volatile semiconductor memory, etc.) that can be used to store application programs, data files, digital media content, etc.

The client device 102 may represent any type of computational device known in the art such as, for example, a workstation, personal computer, client server, laptop, hand held computer, telephony device, network appliance, etc. Furthermore, the system 100 may include multiple client devices capable of communicating with the server 104 over the network 106 that each include the components and capabilities described with respect to the client device 102.

As further illustrated in FIG. 1, the system 100 may also include a router 110 that provides the client device 102 (e.g., network PC) access to other remote servers 112 and associated databases 114 over the internet 116. Depending on the exact type of network being used and the specific topology of the network configuration created, the client device 102 could access a remote server 112 directly over the network 106, through a direct connection from the client device 102 to the internet 116 or through other means without utilizing the router 110.

In the exemplary system 100, the PC device 102 includes one or more chips having electrically programmable capabilities, such as "eFuse" technology developed by IBM. This technology utilizes a combination of unique software algorithms and microscopic electrical fuses to help chips regulate and adapt to changing conditions and system demands by adjusting their circuitry. Particularly, an eFuse device may be programmed by passing a sufficient current through the structure such that its resistance is significantly altered from its initially fabricated state. One exemplary use for such technology is described hereinafter.

Figure 2A:
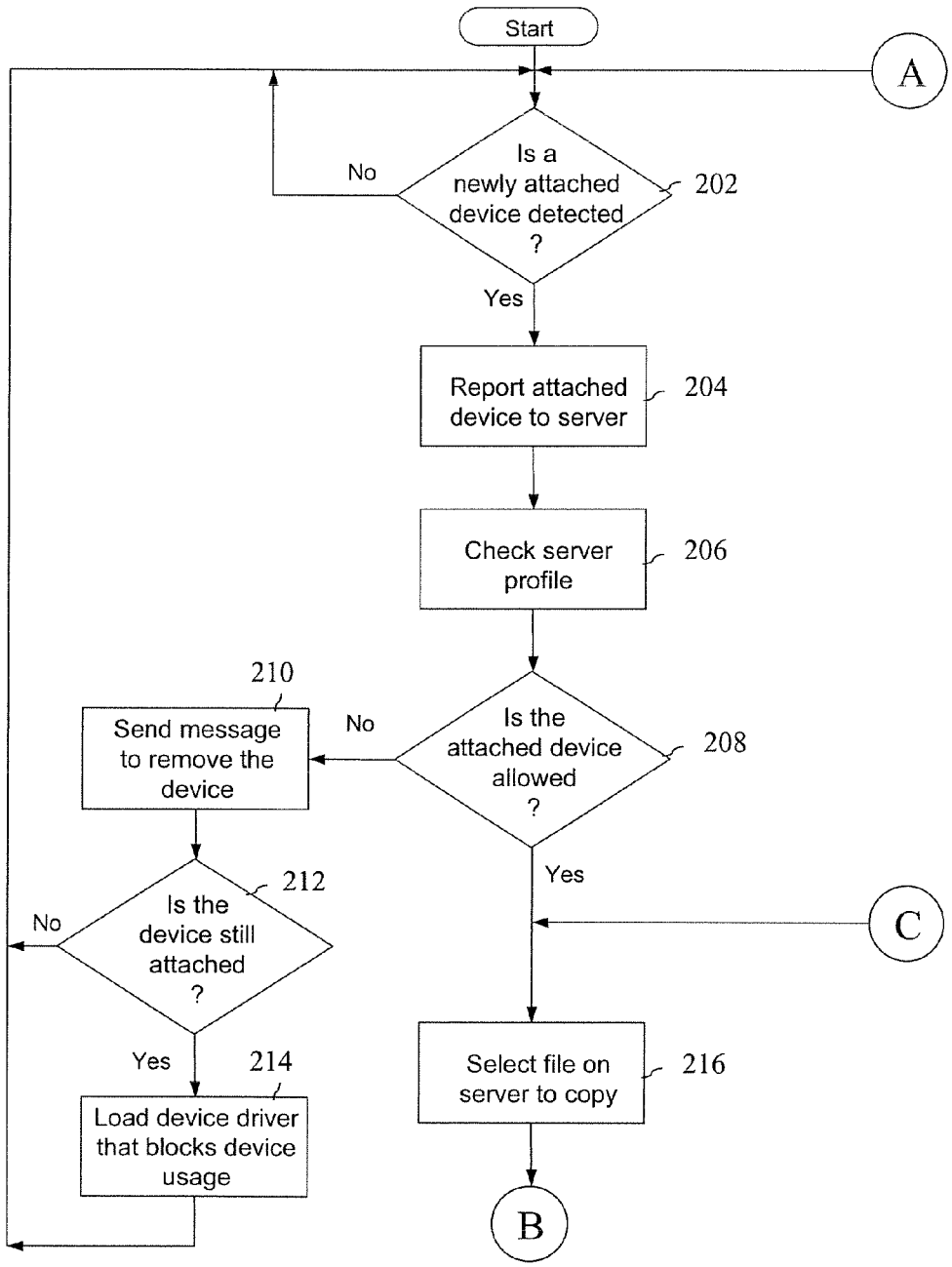
FIGS. 2(a) and 2(b) are a flow diagram illustrating a method for securing personal computing devices from unauthorized data copying and removal, in accordance with an embodiment of the invention.
Figure 2B:
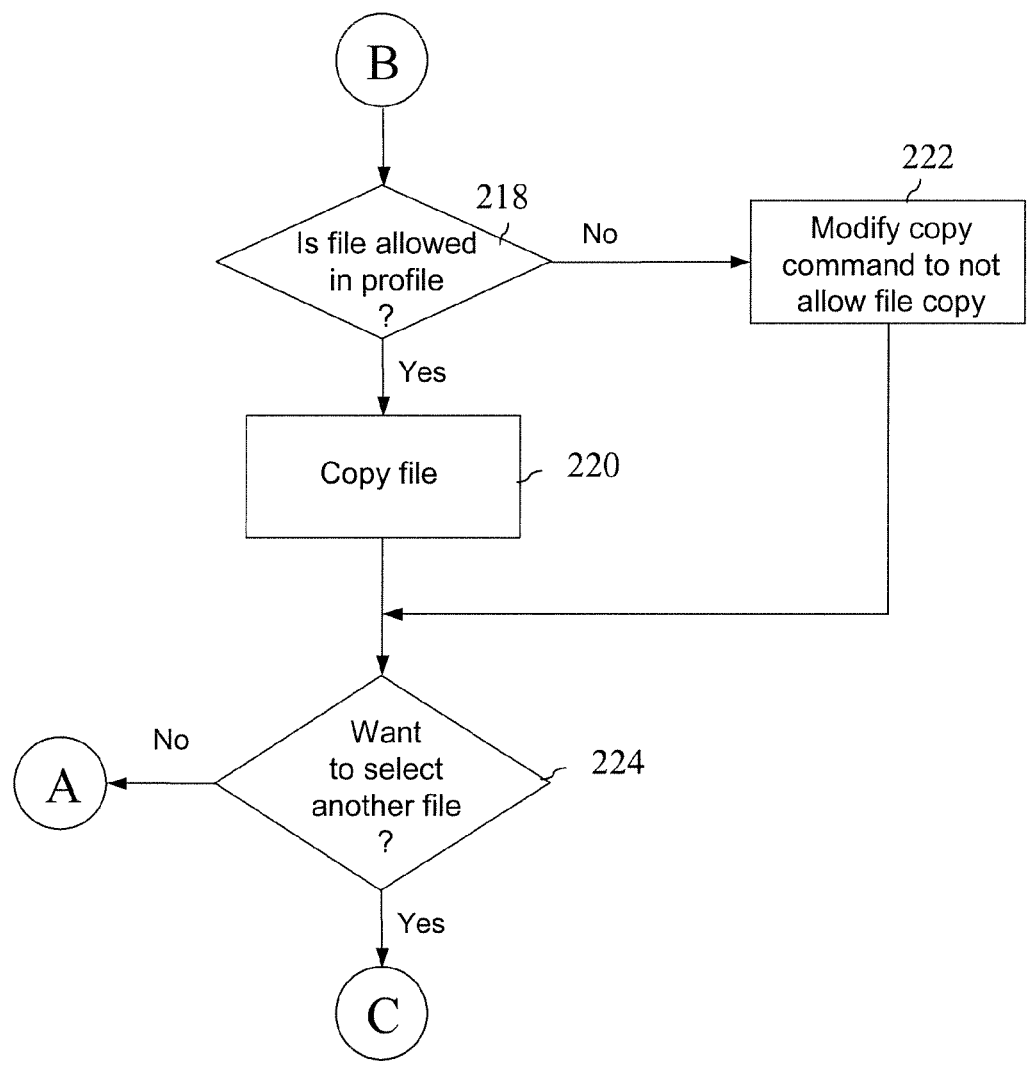

Referring now to FIGS. 2(a) and 2(b), there is shown a method 200 for securing personal computing devices from unauthorized data copying and removal, in accordance with an embodiment of the invention. The method 200 begins at decision block 202 in FIG. 2(a) for a determination of whether any newly attached devices to a PC (e.g., client device 102) in FIG. 1 have been detected. If no newly attached devices are detected, the process iteratively loops back for continuous determination as shown. Alternatively, the process 200 can exit at this point, or could be characterized as beginning only upon detection of a newly attached device to the PC. In any event, once an attached device is detected, its presence is reported to a server in the network as shown in block 204. At this point, a server profile is checked to determine whether the specifically detected device is permitted to be attached to the PC, as shown in block 206.

If it is determined at decision block 208 that the attached device is not in fact allowed, then the server sends a message to the PC to prompt the user of the PC (presumably the individual who attached the device) to remove the device from the PC, as shown in block 210. If the attached device is then subsequently removed, the process may exit at that point, or alternatively loop back to the beginning as shown in FIG. 2(a) to continue to monitor for attached devices. However, if at decision block 212 it is determined that the device has not been removed, then the server will cause a device driver to be loaded onto the PC (shown at block 214), which will replace an existing device driver thereon. As a result, the attached device will not be capable of being operated in conjunction with that PC. Optionally, the PC user may be sent multiple removal messages over a specified period of time before the replacement device driver is actually loaded onto the PC, but prior to allowing operation of the attached device.

In the event a replacement driver is installed on the PC, the replacement driver may be configured to periodically send a message back to the server. If the server fails to receive such periodic messages, then it would determine that the replacement driver has been removed, and thus log a security infraction and generate some type of security notification in an appropriate manner.

Once again, if a replacement driver is loaded (thus disabling operation of the detected attached device to the PC), the process may return back to block 202 for detection of additional devices or may alternatively exit at this point. On the other hand, if it is determined back at decision block 208 that the detected attached device is allowed, then the method 200 proceeds to block 216 where a selection is made as to which file(s) of the server are requested to be copied onto the attached device.

Even where the device is permitted to be attached to the PC, the present method embodiment employs another level of security as shown by the portion of the flow diagram in FIG. 2(b). At decision block 218, it is determined whether the requested file is one that is listed in the PC profile; i.e., whether the PC is allowed to copy the file in the first place. If so, then the file is copied as shown in block 220. However, if the file is not allowed to be copied as indicated from the server profile, then the copy command on the PC is modified so as not to allow copying of the file, as shown in block 222. In an exemplary embodiment, the modification includes installing a new copy command program on the PC, which will first check a list of files not allowed to be copied. The list of files not allowed to be copied is sent from the server to the PC and will reside on the PC. The modification adds the file attempted to be copied to the PC. If the copy command program finds the file attempted to be copied, then the copy command will not copy the file.

As a more permanent alternative to modifying the copy command, an attempt at copying an unauthorized file may alternatively result in the blowing of electrically programmable fuse devices (e.g., eFuse devices discussed above) in the PC circuitry so as to physically sever certain circuit paths, thereby preventing the copying of any file at all. Such an action may be desirable, for example, following repeated attempts to copy unauthorized files by the same PC. In certain circumstances, it may be possible (for a limited number of times) to restore copy functionality by blowing certain additional fuses to create new circuit paths. After a certain amount of iterations where more and more fuses have been blown, there will come a point in time when the device functionality can no longer be restored. Conceivably, however, such a security measure could be implemented through the used of phase change material (PCM) fuse devices, in which the resistivity of the PCM can be repeatedly programmed from a low resistance to a high resistance state, and vice versa.

Finally, method 200 proceeds to decision block 224, where it is determined whether another file is desired to be selected for copying. If so, the process returns back to block 216 (assuming copy capability has not been permanently disabled); otherwise, the process loops back to the beginning to monitor the connection of other devices (or exits).

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for securing personal computing devices from unauthorized data copying and removal, the method comprising:
   detecting a physical attachment of a device to a client included within a computing network;
   determining whether the detected physically attached device is permitted to be attached to the client;
   prompting a user of the client to remove the physically attached device therefrom in the event the detected physically attached device is not permitted to be attached to the client;
   loading a replacement device driver onto the client in the event the physically attached device has not been removed, wherein the replacement device driver prevents the client from copying data to the physically attached device; and
   receiving one or more periodic messages sent from the replacement driver to a server, upon installation of the replacement driver onto the client, wherein a subsequent loss of the periodic messages sent from the replacement driver to the server results in a security infraction condition recorded within the network.

2. The method of claim 1, wherein the determination of whether the detected physically attached device is permitted to be physically attached to the client is implemented by examination of a client profile stored on a server included within the computing network.

3. The method of claim 1, further comprising:
   receiving, in the event the physically attached device is permitted to be physically attached to the client, a request from the client to copy a file stored on a server included within the computing network;
   determining whether the requested file is permitted to be copied by the requesting client; and
   modifying a copy command on the requesting client in the event that the requested file is not permitted to be copied by the requesting client;
   wherein the modified copy command results in the prevention of copying of the requested file by the requesting client.

4. The method of claim 3, wherein the determination of whether the requested file is permitted to be copied by the requesting client is implemented by examination of a client profile stored within the computing network.

5. The method of claim 4, wherein the modifying a copy command on the requesting client further comprises:
   installing a new copy command on the requesting client, the new copy command configured to check a list of files not permitted to be copied by the requesting client; and
   sending the list of files not permitted to be copied by the requesting client to the requesting client and storing the list thereon.

6. The method of claim 1, further comprising:
   receiving, in the event the physically attached device is permitted to be attached to the client, a request from the client to copy a file stored on a server included within the computing network;
   determining whether the requested file is permitted to be copied by the requesting client; and
   blowing one or more electrically programmable fuse devices included within circuitry of the requesting client in the event that the requested file is not permitted to be copied by the requesting client;
   wherein the blown programmable fuse devices within the requesting client results in disabling of the requesting client from copying any files within the computing network.

7. A method for securing personal computing devices from unauthorized data copying and removal, the method comprising:
   detecting a physical attachment of a device to a client included within a computing network;

determining whether the detected physically attached device is permitted to be attached to the client by examination of a client profile stored on a server included within the computing network;

prompting a user of the client to remove the physically attached device therefrom in the event the detected physically attached device is not permitted to be attached to the client;

loading a replacement device driver onto the client in the event the physically attached device has not been removed, wherein the replacement device driver prevents the client from copying data to the physically attached device;

receiving one or more periodic messages sent from the replacement driver to a server, upon installation of the replacement driver onto the client, wherein a subsequent loss of the periodic messages sent from the replacement driver to the server results in a security infraction condition recorded within the network;

receiving, in the event the physically attached device is permitted to be attached to the client, a request from the client to copy a file stored within the computing network;

determining whether the requested file is permitted to be copied by the requesting client; and preventing copying of the requested file by the requesting client in the event that the requested file is not permitted to be copied by the requesting client.

8. The method of claim 7, wherein the preventing copying of the requested file comprises modifying a copy command on the requesting client.

9. The method of claim 8, wherein the modifying a copy command on the requesting client further comprises:

installing a new copy command on the requesting client, the new copy command configured to check a list of files not permitted to be copied by the requesting client; and sending the list of files not permitted to be copied by the requesting client to the requesting client and storing the list thereon.

10. The method of claim 7, wherein the preventing copying of the requested file comprises blowing one or more electrically programmable fuse devices included within circuitry of the requesting client in the event that the requested file is not permitted to be copied by the requesting client, wherein the blown programmable fuse devices within the requesting client results in disabling of the requesting client from copying any files within the computing network.

11. A system for securing personal computing devices from unauthorized data copying and removal, comprising:

a computing network including a client in communication with one or more servers; and the computing network further configured to:

detect a physical attachment of a device to the client;

determine whether the detected physically attached device is permitted to be physically attached to the client;

prompt a user of the client to remove the physically attached device therefrom in the event the physically detected attached device is not permitted to be physically attached to the client;

load a replacement device driver onto the client in the event the physically attached device has not been removed, wherein the replacement device driver prevents the client from copying data to the attached device; and receive one or more periodic messages sent from the replacement driver to one of the one or more servers, upon installation of the replacement driver onto the client, wherein a subsequent loss of the periodic messages sent from the replacement driver to one of the one or more servers results in a security infraction condition recorded within the network.

12. The system of claim 11, wherein the determination of whether the detected physically attached device is permitted to be attached to the client is implemented by examination of a client profile stored on one of the one or more servers included within the computing network.

13. The system of claim 11, wherein the network is further configured to:

receive, in the event the physically attached device is permitted to be physically attached to the client, a request from the client to copy a file stored on one of the one or more servers included within the computing network;

determine whether the requested file is permitted to be copied by the requesting client; and modify a copy command on the requesting client in the event that the requested file is not permitted to be copied by the requesting client;

wherein the modified copy command results in the prevention of copying of the requested file by the requesting client.

14. The system of claim 13, wherein the determination of whether the requested file is permitted to be copied by the requesting client is implemented by examination of a client profile stored within the computing network.

15. The method of claim 14, wherein then network is configured to modify the copy command on the requesting client by:

installing a new copy command on the requesting client, the new copy command configured to check a list of files not permitted to be copied by the requesting client; and sending the list of files not permitted to be copied by the requesting client to the requesting client and storing the list thereon.

16. The system of claim 11, wherein the network is further configured to:

receive, in the event the physically attached device is permitted to be physically attached to the client, a request from the client to copy a file stored on a server included within the computing network;

determine whether the requested file is permitted to be copied by the requesting client; and blow one or more electrically programmable fuse devices included within circuitry of the requesting client in the event that the requested file is not permitted to be copied by the requesting client;

wherein the blown programmable fuse devices within the requesting client results in disabling of the requesting client from copying any files within the computing network.

* * * * *